(12) United States Patent
Killilea et al.

(10) Patent No.: US 8,057,893 B2
(45) Date of Patent: Nov. 15, 2011

(54) COATING SYSTEM FOR CEMENT COMPOSITE ARTICLES

(75) Inventors: T. Howard Killilea, North Oaks, MN (US); Kevin W. Evanson, Maple Grove, MN (US); Larry Lloyd Herfindal, Chisago City, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 547 days.

(21) Appl. No.: 12/184,150

(22) Filed: Jul. 31, 2008

(65) Prior Publication Data

US 2009/0029157 A1 Jan. 29, 2009

Related U.S. Application Data

(63) Continuation of application No. PCT/US2007/002802, filed on Jan. 31, 2007.

(60) Provisional application No. 60/764,044, filed on Jan. 31, 2006, provisional application No. 60/802,185, filed on May 19, 2006.

(51) Int. Cl.
*B32B 27/32* (2006.01)
*B32B 5/16* (2006.01)
*B32B 27/00* (2006.01)
*B05D 3/02* (2006.01)

(52) U.S. Cl. ........ 428/330; 428/220; 428/323; 428/332; 428/500

(58) Field of Classification Search .................. None
See application file for complete search history.

(56) References Cited

U.S. PATENT DOCUMENTS

| | | |
|---|---|---|
| 2,128,961 A | 9/1938 | Patterson |
| 2,356,542 A | 8/1944 | Sloan |
| 2,633,458 A | 3/1953 | Shokal |
| 2,674,775 A | 4/1954 | Willson |
| 2,727,012 A | 12/1955 | Treat et al. |
| 2,730,517 A | 1/1956 | Vogel et al. |
| 3,010,919 A | 11/1961 | MacKinney et al. |
| 3,049,458 A | 8/1962 | Willard |
| 3,091,551 A | 5/1963 | Robertson |
| 3,219,467 A | 11/1965 | Redican et al. |
| 3,380,831 A | 4/1968 | Cohen et al. |
| 3,449,161 A | 6/1969 | Hindersinn et al. |
| 3,655,423 A | 4/1972 | Lin et al. |
| 3,781,396 A | 12/1973 | Okuda et al. |
| 3,899,611 A | 8/1975 | Hall |
| 3,935,173 A | 1/1976 | Ogasawara et al. |
| 3,935,364 A | 1/1976 | Prokesh et al. |
| 3,970,628 A | 7/1976 | Connelly et al. |
| 4,015,040 A | 3/1977 | Yoshida et al. |
| 4,028,294 A | 6/1977 | Brown et al. |
| 4,113,893 A | 9/1978 | Hahn |
| 4,132,526 A | 1/1979 | Schwarz et al. |
| 4,197,389 A | 4/1980 | Becker et al. |
| 4,228,761 A | 10/1980 | Glover et al. |
| 4,333,867 A | 6/1982 | Sauntson |
| 4,385,152 A | 5/1983 | Boyack et al. |
| 4,390,688 A | 6/1983 | Walz et al. |
| 4,408,018 A | 10/1983 | Bartman et al. |
| 4,486,553 A | 12/1984 | Wesch |
| 4,522,962 A | 6/1985 | Abbey et al. |
| 4,536,534 A | 8/1985 | Singer et al. |
| 4,582,755 A | 4/1986 | Dietrich |
| 4,598,108 A | 7/1986 | Hoefs |
| 4,719,149 A | 1/1988 | Aasen et al. |
| 4,742,121 A | 5/1988 | Toman |
| 4,852,316 A | 8/1989 | Webb |
| 4,880,660 A | 11/1989 | Aasen et al. |
| 4,886,852 A | 12/1989 | Numa |
| 4,908,229 A | 3/1990 | Kissel |
| 4,916,004 A | 4/1990 | Ensminger et al. |
| 5,017,632 A | 5/1991 | Bredow et al. |
| 5,073,578 A | 12/1991 | Boodaghains et al. |
| 5,100,948 A | 3/1992 | Aydin et al. |
| 5,296,530 A | 3/1994 | Bors et al. |
| 5,356,716 A | 10/1994 | Patel |
| 5,407,783 A | 4/1995 | Caruso |
| 5,409,984 A | 4/1995 | Gerhardinger |
| 5,418,264 A | 5/1995 | Obloh et al. |
| 5,426,142 A | 6/1995 | Rosano et al. |
| 5,461,125 A | 10/1995 | Lu et al. |
| 5,484,849 A | 1/1996 | Bors et al. |
| 5,500,457 A | 3/1996 | Sarkar et al. |
| 5,534,310 A | 7/1996 | Rokowski et al. |
| 5,559,192 A | 9/1996 | Bors et al. |
| 5,562,953 A | 10/1996 | Bors et al. |
| 5,567,767 A | 10/1996 | Smeal et al. |

(Continued)

FOREIGN PATENT DOCUMENTS

AU 198060655 A1 3/1981

(Continued)

OTHER PUBLICATIONS

ASTM D6944-03, Test Method A (2003). Koleske et al., *Two Thousand Three Additives Guide*, Paint and Coatings Industry, pp. 12-86, (Apr. 2003).
Witzeman, J. S. et al., *Comparison of Methods for the Preparation of Acetoacetylated Coating Resins*, Coatings Technology; vol. 62, No. 789, pp. 101-112 (Oct. 1990).
American Society of Testing Materials, ASTM Designation: D523-89, "Standard Test Method for Specular Gloss;" 5 pages, (Reapproved 1999).

(Continued)

*Primary Examiner* — Sheeba Ahmed
(74) *Attorney, Agent, or Firm* — IPLM Group, P.A.

(57) ABSTRACT

A coated article including a cement fiberboard substrate and a coating system applied to the substrate, wherein the coating system comprises (i) at least one acid-functional alkali-soluble polymer having a backbone substantially free of linear or branched aliphatic alkyl repeating units having more than 3 backbone carbon carbons, (ii) at least one water-soluble silicate salt and (iii) water.

21 Claims, 1 Drawing Sheet

U.S. PATENT DOCUMENTS

| | | | |
|---|---|---|---|
| 5,571,863 A | 11/1996 | Smeal et al. |
| 5,672,379 A | 9/1997 | Schall et al. |
| 5,681,385 A | 10/1997 | Beckenhauer |
| 5,688,867 A | 11/1997 | Scheibelhoffer et al. |
| 5,708,077 A | 1/1998 | Nölken et al. |
| 5,708,093 A | 1/1998 | Bastelberger et al. |
| 5,718,943 A | 2/1998 | Hsu et al. |
| 5,766,768 A | 6/1998 | Cummings et al. |
| 5,777,053 A | 7/1998 | McBain et al. |
| 5,798,426 A | 8/1998 | Anton et al. |
| 5,814,397 A | 9/1998 | Cagliostro et al. |
| 5,869,590 A | 2/1999 | Clark et al. |
| 5,874,503 A | 2/1999 | Scheibelhoffer et al. |
| 5,928,778 A | 7/1999 | Takahashi et al. |
| 5,945,044 A | 8/1999 | Kawai et al. |
| 5,962,571 A | 10/1999 | Overbeek et al. |
| 5,973,068 A | 10/1999 | Yamaya et al. |
| 5,994,428 A | 11/1999 | Lutz et al. |
| 5,997,952 A | 12/1999 | Harris et al. |
| 6,030,447 A | 2/2000 | Naji et al. |
| 6,045,871 A | 4/2000 | Matt et al. |
| 6,045,873 A | 4/2000 | Adachi et al. |
| 6,048,471 A | 4/2000 | Henry |
| 6,063,864 A | 5/2000 | Mathur et al. |
| 6,103,352 A | 8/2000 | Takahashi |
| 6,114,440 A | 9/2000 | Yamaya et al. |
| 6,136,383 A | 10/2000 | Schwartz et al. |
| 6,146,710 A | 11/2000 | Symons |
| 6,162,511 A | 12/2000 | Garnett et al. |
| 6,235,228 B1 | 5/2001 | Nicholl et al. |
| 6,297,320 B1 * | 10/2001 | Tang et al. ............. 525/107 |
| 6,346,146 B1 | 2/2002 | Duselis et al. |
| 6,458,250 B1 | 10/2002 | Holliday et al. |
| 6,475,556 B1 | 11/2002 | Sobczak et al. |
| 6,485,601 B1 | 11/2002 | Egan et al. |
| 6,485,793 B1 | 11/2002 | Ott et al. |
| 6,492,450 B1 | 12/2002 | Hsu |
| 6,506,248 B1 | 1/2003 | Duselis et al. |
| 6,534,176 B2 | 3/2003 | Terase et al. |
| 6,555,625 B1 | 4/2003 | Overbeek et al. |
| 6,590,025 B1 | 7/2003 | Carlson et al. |
| 6,635,735 B1 | 10/2003 | Zhang et al. |
| 6,638,567 B1 | 10/2003 | Beisele |
| 6,641,629 B2 | 11/2003 | Safta et al. |
| 6,649,679 B1 | 11/2003 | Stockl et al. |
| 6,660,386 B2 | 12/2003 | Haque |
| 6,696,518 B1 | 2/2004 | Dersch et al. |
| 6,740,423 B2 | 5/2004 | Murase |
| 6,753,394 B2 | 6/2004 | Weikard et al. |
| 6,762,230 B2 | 7/2004 | Brandenburger et al. |
| 6,818,697 B2 | 11/2004 | Zhang et al. |
| 6,849,338 B2 | 2/2005 | Clemens et al. |
| 6,893,751 B2 | 5/2005 | Naji et al. |
| 6,941,720 B2 | 9/2005 | DeFord et al. |
| 6,998,012 B2 | 2/2006 | Koelliker et al. |
| 7,049,352 B2 | 5/2006 | Gould et al. |
| 7,105,593 B2 | 9/2006 | Solomon et al. |
| 7,148,270 B2 | 12/2006 | Bowe |
| 7,235,595 B2 | 6/2007 | Hermes et al. |
| 7,235,603 B2 | 6/2007 | Madle et al. |
| 7,238,391 B2 | 7/2007 | Dargontina et al. |
| 7,265,166 B2 | 9/2007 | Gebhard et al. |
| 7,338,989 B2 | 3/2008 | Gross et al. |
| 7,381,785 B2 | 6/2008 | Detrembleur et al. |
| 7,449,516 B2 | 11/2008 | Bayer et al. |
| 7,758,954 B2 | 7/2010 | Nguyen et al. |
| 2002/0179240 A1 | 12/2002 | Clemens et al. |
| 2002/0195191 A1 | 12/2002 | Weiss et al. |
| 2003/0055171 A1 | 3/2003 | Overbeek et al. |
| 2003/0073778 A1 | 4/2003 | Zhang et al. |
| 2003/0150359 A1 | 8/2003 | Lassmann |
| 2003/0153673 A1 | 8/2003 | Schwalm et al. |
| 2003/0203991 A1 | 10/2003 | Schottman et al. |
| 2003/0207121 A1 | 11/2003 | McGee |
| 2003/0224184 A1 | 12/2003 | Hermes et al. |
| 2004/0002559 A1 | 1/2004 | Troutman et al. |
| 2004/0044094 A1 | 3/2004 | Garnett |
| 2004/0082715 A1 | 4/2004 | Bayer et al. |
| 2004/0086676 A1 | 5/2004 | Peng |
| 2004/0176502 A1 | 9/2004 | Raymond et al. |
| 2004/0198903 A1 | 10/2004 | Madle et al. |
| 2004/0229978 A1 | 11/2004 | Bowe |
| 2005/0027079 A1 | 2/2005 | Lauer et al. |
| 2005/0053797 A1 | 3/2005 | Rumph et al. |
| 2005/0176321 A1 | 8/2005 | Crette et al. |
| 2005/0203211 A1 | 9/2005 | Gebhard |
| 2005/0208285 A1 | 9/2005 | Lyons et al. |
| 2006/0013950 A1 | 1/2006 | Porter et al. |
| 2006/0024480 A1 | 2/2006 | Lyons et al. |
| 2006/0048708 A1 | 3/2006 | Hartig |
| 2006/0111503 A1 | 5/2006 | Killilea et al. |
| 2006/0135684 A1 | 6/2006 | Killilea |
| 2006/0135686 A1 | 6/2006 | Kililea et al. |
| 2006/0182946 A1 | 8/2006 | Zarb et al. |
| 2006/0288909 A1 | 12/2006 | Naji et al. |
| 2007/0042192 A1 | 2/2007 | Nguyen et al. |
| 2007/0110981 A1 | 5/2007 | Killilea et al. |
| 2007/0259166 A1 | 11/2007 | Killilea et al. |
| 2007/0259188 A1 | 11/2007 | Wu et al. |
| 2007/0269660 A1 | 11/2007 | Killilea et al. |
| 2007/0282046 A1 | 12/2007 | Killilea et al. |
| 2008/0008895 A1 | 1/2008 | Garner et al. |
| 2008/0139737 A1 | 6/2008 | Alderfer et al. |

FOREIGN PATENT DOCUMENTS

| | | |
|---|---|---|
| AU | 2005100347 B4 | 5/2005 |
| DE | 33 02 767 A1 | 8/1984 |
| EP | 0 060 505 A1 | 9/1982 |
| EP | 0 486 278 A1 | 5/1992 |
| EP | 0 623 659 A2 | 11/1994 |
| EP | 0 697 417 A1 | 2/1996 |
| EP | 0 705 855 A2 | 4/1996 |
| EP | 0 728 779 B2 | 8/1996 |
| EP | 0 894 780 A1 | 2/1999 |
| EP | 1 454 935 A1 | 9/2004 |
| EP | 1 473 331 A1 | 11/2004 |
| EP | 1 589 083 A2 | 10/2005 |
| EP | 1 650 045 A2 | 4/2006 |
| GB | 1 407 827 | 9/1975 |
| JP | 54 038323 | 3/1979 |
| JP | 01 229242 | 9/1989 |
| JP | 02 308887 | 12/1990 |
| JP | 08 059939 | 3/1996 |
| JP | 11 236281 | 8/1999 |
| JP | 03 44986 A | 12/2000 |
| JP | 2003251269 | 9/2003 |
| JP | 2005 307161 | 4/2005 |
| JP | 2006 117812 | 5/2006 |
| SU | 833892 | 5/1981 |
| WO | WO 94/07674 A1 | 4/1994 |
| WO | WO 98/45222 | 10/1998 |
| WO | WO 99/67312 | 12/1999 |
| WO | WO 00/23495 A1 | 4/2000 |
| WO | WO 00/56826 | 9/2000 |
| WO | WO 01/68547 A1 | 9/2001 |
| WO | WO 02/070623 A2 | 9/2002 |
| WO | WO 03/000761 A1 | 1/2003 |
| WO | WO 03/076536 A1 | 9/2003 |
| WO | WO 03/101918 A2 | 12/2003 |
| WO | WO 2005/071179 A1 | 8/2005 |
| WO | WO 2006/032512 A | 3/2006 |
| WO | WO 2006/065914 A1 | 6/2006 |
| WO | WO 2007/059516 A1 | 5/2007 |
| WO | WO 2007/087458 A1 | 8/2007 |
| WO | WO 2007/089807 A2 | 8/2007 |
| WO | WO 2007/089913 A1 | 8/2007 |
| WO | WO 2007/090132 A1 | 8/2007 |

OTHER PUBLICATIONS

American Society of Testing Materials, ASTM Designation: D5402-93, "Standard Practice for Assessing the Solvent Resistance of Organic Coatings Using Solvent Rubs;" 3 pages, (Reapproved 1999).

Eastman Chemical Company, Publications N-319C, Kingport, TN., Title Page, Table of Contents, "Acetoacetoxyethyl Methacrylate (AAEM) Acetoacetyl Chemistry," pp. 1-11, (Dec. 1999).

Lewis et al., "Luminescence", Hawley's Condensed Chemical Dictionary, 14th Ed., John Wiley and Sons, Inc., retrieved from Knovel® online; 1 page (2002).
"Photoinitiators for UV Curing," "Darocur 1173", p. 2; Ciba Specialty Chemicals; 8 pages (2003).
U.S. Federal Register, vol. 60, No. 116, pp. 31633-31637, (Jun. 16, 1995).
Wicks, Zeno W. Jr., et al., "Latexes", Organic Coatings, Science and Technology, Second Edition, (Wiley-Interscience, New York), Title Page, Copyright Page, Chapter 8, p. 143, (1999).
Dow® Z-6018 Intermediate Product Information, "Silicone Intermediates", 3 pgs., (Aug. 28, 2006).
ISR and Written Opinion for PCTUS/2007/002802 dated Jul. 9, 2007.
ASTM D6944-03, Test Method A.
Koleske et al., *Two Thousand Three Additives Guide*, Paint and Coatings Ind., Apr. 2003, pp. 1-76.
Witzeman, J. S. et al., *Comparison of Methods for the Preparation of Acetoacetylated Coating Resins*, Coatings Technology; vol. 62, No. 789, Oct. 1990, pp. 101-112 (and references contained therein).
Clemens, R. J. et al., *A Comparison of Catalysts for Crosslinking Acetoacetylated Resins via the Michael Reaction*, Journal of Coatings Technology, Mar. 1989, vol. 61, No. 770, pp. 83-91.
Clemens, R. J., *A Comparison of Catalysts for Crosslinking Acetoacetylated Resins via the Michael Reaction*, Water-Borne & Higher Solids Coatings Symposium, 1988, New Orleans, LA, 55-67.
Wicks, Z.W. et al., *Epoxy and Phenolic Resins*, Organic Coatings Science and Technology, vol. 1, Chapter XI, pp. 162-187.
Tennebroek et al., *New Polymer Synthesis for (self) Crosslinkable Urethanes and Urethane Acrylics*, 4th Nürnberg Congress; International Centre for Coatings Technology, Paper 17, 2000, 19 pages.
Geurts, J.M. et al., *Self-crosslinkable Urethanes and Urethane/Acrylics*, Verfkroniek Nummer, Jan. 1999.
Geon® Lo-Sope Dispersion Resin, Geon® 171 Vinyl Chloride Homopolymer Technical Data Sheet, PolyOne Corporation, May 2003, 2 pages.
Geon Copolymer Dispersion Resin Geon® 137 Vinyl Chloride Copolymer Technical Data Sheet, PolyOne Corporation, Apr. 1997, 2 pages.
Industrial Research Services, *Test Report No. 54703-1 for Epirez Safe Step 100*, CSIRO, Manuf. & Infrastr. Technology, Australia, May 2004, pp. 1-6.

DSM NeoResins, Technical Data Sheet, DSM NeoResins Inc., Bulletin XK-90, Jan. 2006, 6 pages.
Tex•Cote® Stretch Product Information, Textured Coatings of America, Inc., Panama City, Florida, Nov. 2003, 3 pages.
UCAR Emulsion Systems Applications, *Architectural Coatings-Exterior-Cement Fiber Board*, Dow Chemical Company product information sheet printed on Oct. 25, 2007 from the following internet archives website at: http://web.archive.org/web/20041022123748/http://www.dow.com/ucarlatex/app/arch/ex_fiber.htm.
Rector, F.D. et al., *Applicatons for the Acetoacetyl Chemistry in Thermoset Coatings*, Journal of Coatings Technology, vol. 61, No. 771, Apr. 1989.
"Ancarez AR550 Waterborne Epoxy Resin Technical Bulletin", Air Products and Chemicals, Inc., High Performance Coatings Resins, Pub. No. 125-9914, 13 pages, (Mar. 2006).
"Anquamine 401 Curing Agent Technical Bulletin", Air Products and Chemicals, Inc., Epoxy Curing Agents and Modifiers, Publication No. 125-9744,1 page, (May 2004).
"Polycat 41 Catalyst", Product Information Sheet, Air Products and Chemicals, Inc., 2 pages, (2003).
"UV Cured Undercoat Vitrecure 7", Product Data Sheet 74, Architectural & Industrial Coatings, 1 page (Dec. 21, 2004).
"UV Cured Sealer for Cement Based Substrates Vitrecure 9", Product Data Sheet 54, Architectural & Industrial Coatings, 1 page (Jul. 24, 2004).
Hardiplank™ Lap Siding Installation, James Hardie Siding Products, 8 pages, (Dec. 2005), http://www.jameshardie.com/homeowner/technical/installation/hardieplank_installation.php, download from the Dec. 15, 2005 Internet Archive entry at: http://web.archive.org/web/20051215084041/http://www.jameshardie.com/homeowner/installation/hardiplank_installation.php.
"Siding Painting Tips", Paint Manufacturers' Recommendation Sheet—No. S-100, James Hardie Siding Products, 10 pages, (May 2005), http://www.jameshardie.com/homeowner/technical/paintingtips.php, downloaded from the Dec. 14, 2005 Internet Archive entry at: http://web.archive.org/web/20051214022056/http://www.jameshardie.com/homeowner/technical/paintingtips.php.

* cited by examiner

COATING SYSTEM FOR CEMENT COMPOSITE ARTICLES

CROSS-REFERENCE TO RELATED APPLICATION

This application is a continuation of International Application No. PCT/US2007/002802, filed on Jan. 31, 2007, which claims priority from U.S. Provisional Application Ser. Nos. 60/764,044, filed Jan. 31, 2006, and 60/802,185, filed May 19, 2006, the disclosures of which are incorporated herein by reference.

BACKGROUND OF THE INVENTION

Cement composite articles are becoming more and more common for use in building materials. Many of these articles are prepared from inexpensive materials, such as cement, wood (cellulose) fibers, natural (glass) fibers and polymers. These articles usually are prepared in the form of cement fiberboard substrates such as siding panels and boards. The substrate or articles can be made using methods such as extrusion or using a Hatschek machine.

In northern climates, damage from repeated freezing and thawing of water absorbed into the cement fiberboard substrate represents a significant problem. Continued exposure to moisture, freeze-thaw cycles, UV exposure and atmospheric carbon dioxide can cause physical and chemical changes in articles made from cement fiberboard compositions over time. Coating systems or coating compositions can prevent exposure to the elements such as UV light, carbon dioxide and water, or can help reduce the damage that can occur due to exposure to these elements. Several such systems are available for protecting cement fiberboard articles. However, there is a need for coating systems and coating compositions that provide a superior seal, have the ability to cure rapidly or can provide improved results when an article coated with the composition is submitted to wet adhesion testing and multiple freeze-thaw cycles.

SUMMARY

The present invention provides in one aspect a coated article including a cement fiberboard substrate and a coating system applied to the substrate, wherein the coating system comprises (i) at least one acid-functional alkali-soluble polymer having a backbone substantially free of linear or branched aliphatic alkyl repeating units having more than 3 backbone carbon carbons, (ii) at least one water-soluble silicate salt and (iii) water. The disclosed coating system includes one or more coating compositions that may be applied in one or more layers, or can be mixed with another composition (e.g., on the substrate) to form a coating composition.

In another aspect, the invention provides a method for preparing a coated article, which method comprises applying the above-described coating system to the above-described cement fiberboard substrate and drying the coated article.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawing and the description below. Other features, objects, and advantages of the invention will be apparent from the description and drawings, and from the claims.

BRIEF DESCRIPTION OF THE DRAWING

Like reference symbols in the various figures of the drawing indicate like elements. The elements in the drawing are not to scale.

DETAILED DESCRIPTION

An "alkali-soluble" polymer means a polymer having sufficient acid functionality to render the polymer soluble or dispersible in water when mixed with a base.

A "latex" polymer means a dispersion or emulsion of polymer particles in water containing one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

A "water-dispersible" polymer means a polymer which is capable of being combined by itself with water, without requiring the use of a secondary dispersing or emulsifying agent, to obtain an aqueous dispersion or emulsion of polymer particles having at least a one month shelf stability at normal storage temperatures.

A polymer "backbone" means elements within a main polymer chain excluding pendent groups. For example, a styrenic polymer contains polymerized vinyl groups which form elements containing two carbon atoms per repeating unit in the backbone with pendant aromatic ring groups.

The terms "a," "an," "the," "at least one," and "one or more" are used interchangeably.

The recitation of numerical ranges by endpoints includes all numbers subsumed within that range (e.g., 1 to 5 includes 1, 1.5, 2, 2.75, 3, 3.80, 4, 5, etc.).

The term "comprises" and variations thereof does not have a limiting meaning where such term appears in the description or claims. Thus, for example, a composition comprising a wax compound means that the composition includes one or more wax compounds.

The terms "acrylate esters" and "methacrylate esters" refer to esters of acrylic acid and esters of methacrylic acid, respectively. They may be referred to as (meth)acrylates or (meth)acrylate esters.

The term "olefinic compound" refers to any monomer, oligomer or polymer containing reactive ethylenic unsaturation, such as vinyls, (meth)acrylates, vinyl ethers, allyl ethers, vinyl esters, unsaturated oils (including mono, di and triglycerides), unsaturated fatty acids, and the like. The term "olefinic group" refers to the reactive ethylenic unsaturated functional group in an olefinic compound.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The disclosed articles may be coated on one or more surfaces with the disclosed coating system. The coating system includes (i) at least one acid-functional alkali-soluble polymer having a backbone substantially free of linear or branched aliphatic alkyl repeating units having more than 3 backbone carbon carbons, (ii) at least one water-soluble silicate salt and (iii) water. Water-soluble silicate salts are relatively alkaline, and can promote premature gelation, settling or flocculation of a latex polymer. This may be compensated for by increasing the amount of surfactant or emulsifier in the latex. However, when applied to a cement fiberboard substrate the resulting modified latex may be undesirably prone to foaming or may exhibit undue water sensitivity. The disclosed acid-functional alkali-soluble polymers can form emulsions or dispersions having good storage stability despite the presence of water-soluble silicate salts, and the water-soluble silicate salts can actually assist in stabilizing the acid-functional alkali-soluble polymer in water. In this context, storage stability may be evaluated by heating the composition to about 50° C. for two weeks and more preferably one month to determine whether the composition does not undesirably settle, flocculate or gel.

The disclosed compositions may contain additional ingredients including various latex polymers, water-dispersible polymers, olefinic compounds and epoxy resins as discussed in more detail below. The disclosed acid-functional alkali-soluble polymer can also be combined with latex-forming monomers and water and may serve as a support or colloidal stabilizer during the formation of latex polymer particles from such monomers, as discussed in more detail below.

Preferred coating systems may also include one or more of the following additional features:
  increasing the resistance of the article to water uptake (into the article);
  improving or promoting adhesion of additional coatings to the article surface (e.g., topcoats);
  increasing the surface integrity of the article (e.g., by acting to reinforce the fiber and cement matrix much like binder in other composite materials);
  protecting against expansion of the article under freeze/thaw conditions; or
  increasing the integrity of the edges of the article by binding the fiber layers together.

Figure 1:
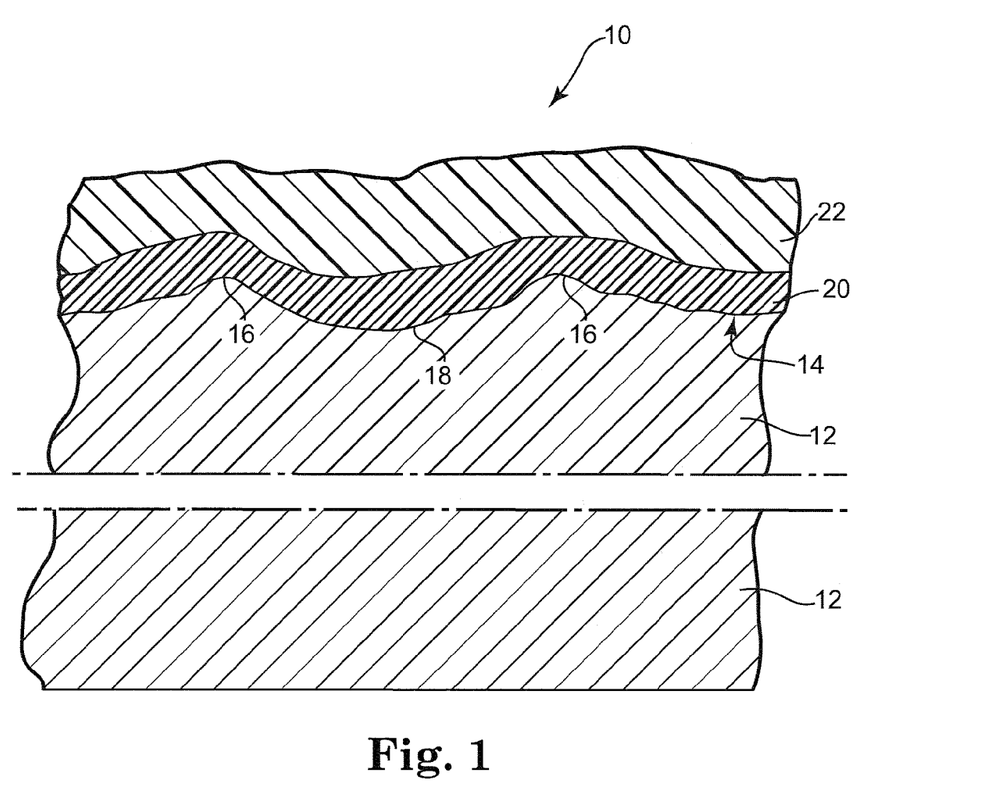
FIG. 1 is a schematic cross-sectional view of a coated fiber cement article.

Referring to FIG. 1, a coated article 10 of the present invention is shown in schematic cross-sectional view. Article 10 includes a cement fiberboard substrate 12. Substrate 12 typically is quite heavy and may for example have a density of about 1 to about 1.6 g/cm$^3$ or more. The first major surface 14 of substrate 12 may be embossed with small peaks or ridges 16 and valleys 18, e.g., so as to resemble roughsawn wood. Major surface 14 may have a variety of other surface configurations, and may resemble a variety of building materials other than roughsawn wood. Layer or layers 20 of the disclosed coating system lie atop and partially penetrate surface 14, and desirably are applied to article 10 at the location where article 10 is manufactured. Layers 20 help to protect substrate 12 against one or more of exposure to moisture, freeze-thaw cycles, UV exposure or atmospheric carbon dioxide. Layers 20 also may provide a firmly-adhered base layer upon which one or more firmly-adhered layers of final topcoat 22 may be formed. Final topcoat 22 desirably is both decorative and weather-resistant, and may be applied to article 10 at the location where article 10 is manufactured or after article 10 has been attached to a building or other surface.

A variety of cement fiberboard substrates may be employed in the disclosed articles. The disclosed substrates typically include cement and a filler. Exemplary fillers include wood, fiberglass, polymers or mixtures thereof. The substrates can be made using methods such as, extrusion, the Hatschek method, or other methods known in the art. See, e.g., U.S. patent application No. 2005/0208285 A1 (corresponds to International Patent Application No. WO 2005/071179 A1); Australian Patent Application No. 2005100347; International Patent Application No. WO 01/68547 A1; International Patent Application No. WO 98/45222 A1; U.S. patent application No. 2006/0288909 A1; and Australian Patent Application No. 198060655 A1. Non-limiting examples of such substrates include siding products, boards and the like, for uses including fencing, roofing, flooring, wall boards, shower boards, lap siding, vertical siding, soffit panels, trim boards, shaped edge shingle replicas and stone or stucco replicas. One or both major surfaces of the substrate may be profiled or embossed to look like a grained or roughsawn wood or other building product, or scalloped or cut to resemble shingles. The uncoated substrate surface typically contains a plurality of pores with micron- or submicron-scale cross-sectional dimensions.

A variety of suitable fiber cement substrates are commercially available. For example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fiber cement. Other suitable fiber cement siding substrates include AQUAPANEL™ cement board products from Knauf USG Systems GmbH & Co. KG of Iserlohn, Germany, CEMPLANK™, CEMPANEL™ and CEMTRIM™ cement board products from Cemplank of Mission Viejo, Calif.; WEATHERBOARDS™ cement board products from CertainTeed Corporation of Valley Forge, Pa.; MAXITILE™, MAXISHAKE™ AND MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

The disclosed coating systems may contain a variety of acid-functional alkali-soluble polymers. The acid-functional alkali-soluble polymer has a backbone substantially free of linear or branched aliphatic alkyl repeating units having more than 3 backbone carbon carbons. Representative such repeating units include —(C$_4$H$_8$)— units such as —(CH$_2$)$_4$— and hydrogenated butadiene radicals, and —(C$_5$H$_{10}$)— units such as —(CH$_2$CH(CH$_3$)(CH$_2$)$_2$)— and hydrogenated isoprene radicals. The acid-functional alkali-soluble polymer preferably contains less than 10 wt. % of such repeating units, more preferably less than 8 wt. % and most preferably less than 5 wt. % based on the weight of polymer solids. Exemplary acid-functional alkali-soluble polymers may be prepared by making a polymer with acrylic or methacrylic acid or other polymerizable acid monomer and neutralizing the polymer by addition of ammonia or other base, as is further described in U.S. patent application Ser. Nos. 11/300,070 and 11/342,412 and in U.S. Pat. No. 5,962,571. Commercially-available acid-functional alkali-soluble polymers include JONCRYL™ 675 and JONCRYL 678 from Johnson Polymer Corp. A variety of polymeric materials may be employed to make acid-functional alkali-soluble polymers, including (meth)acrylics, vinyls, oil-modified polymers, polyesters, polyurethanes, polyamides, chlorinated polyolefins, and mixtures or copolymers thereof. Preferred alkali-soluble polymers have a number average molecular weight of no more than 50,000 daltons, more preferably a number average molecular weight no more than 25,000 daltons, and most preferably a number average molecular weight no more than 15,000 daltons. Typically a chain transfer agent such as a mercaptan is utilized to control molecular weight using techniques that will be familiar to those having ordinary skill in the art. Preferred mercaptans include dodecyl mercaptan and 3-mercaptopropionic acid.

Latex polymers are readily synthesized at modest cost and provide a preferred class of acid-functional alkali-soluble polymers. Latex polymers are typically prepared through chain-growth polymerization, using one or more olefinic compounds (preferably monomers). The reactants preferably include at least one acid-functional monomer in an amount sufficient to provide at least 5 wt. %, more preferably at least 6 wt. % and yet more preferably at least 8 wt. % acidic monomers in the reaction mixture. Non-limiting examples of olefinic compounds which may be used to prepare latex polymers include ethylene, butadiene, propene, butene, isobutene, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxypropyl acrylate, hydroxybutyl acrylate, hydroxybutyl methacrylate, glycidyl methacrylate, 4-hydroxybutyl acrylate glycidylether, acrylamide, methylacrylamide, styrene, α-methyl styrene, vinyl toluene, vinyl acetate, vinyl propionate, allyl methacrylate, acetoacetyl ethyl methacrylate (AAEM), diacetone acrylamide, dimethylaminomethacrylate, diethylaminomethacrylate, N-hydroxy(meth)acrylamide, vinyl ether maleate, vinyl esters of VERSATIC™ acid (VERSATIC acid is a synthetic saturated monocarboxylic acid of highly branched structure containing about 5 to about ten carbon atoms), and mixtures thereof. Preferably, the latex polymer is an acid-functional alkali-soluble (meth)acrylic polymer. The latex polymer may optionally also be functionalized with olefinic groups or other crosslinkable groups where it is desired to enable the latex polymer to participate in radiation curing. Further details regarding such functionalized polymers are contained in applicants' copending PCT Application Serial No. PCT/U.S.2007/061326, filed Jan. 30, 2007 and entitled COATING COMPOSITION FOR CEMENT COMPOSITE ARTICLES.

The latex polymers are typically stabilized using one or more nonionic or anionic emulsifiers (viz., surfactants), used either alone or together. Examples of nonionic emulsifiers include tert-octylphenoxyethylpoly(39)-ethoxyethanol, dodecyloxypoly(10)-ethoxyethanol, nonylphenoxyethylpoly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene (20)lauramide, N-lauryl-N-polyoxyethylene(3)amine and poly(10)ethylene glycol dodecyl thioether. Examples of anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcosinate, sodium 1-alkoxy-2-hydroxypropyl sulfonate, sodium alpha-olefin ($C_{14}$-$C_{16}$) sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate and the like. In addition, combinations of emulsifiers can be used.

A water-soluble free radical initiator is typically used in the polymerization of a latex polymer. Exemplary water-soluble free radical initiators are described below. The amount of initiator is preferably from 0.01 wt. % to 3 wt. %, based on the total amount of monomer. In a redox system the amount of reducing agent is preferably from 0.01 wt. % to 3 wt. %, based on the total amount of monomer. The reaction temperature may be in the range of 10° C. to 100° C.

A variety of acid-functional alkali-soluble water-dispersible polymers may also be used in the disclosed coating systems. Exemplary water-dispersible polymers include polyurethanes, polyamides, chlorinated polyolefins, (meth)acrylics, vinyls, oil-modified polymers, polyesters, and mixtures or copolymers thereof. The water-dispersible polymer typically will include as a part of the polymer a group or groups which render the polymer dispersible by itself in water. Preferably, the water-dispersible polymer is an acid-functional alkali-soluble polyurethane. Water-dispersible polyurethanes may be made in a variety of ways. One method for preparing water-dispersible polyurethanes involves reacting one or more isocyanates with one or more hydroxy compounds that include an appropriate functional group. Exemplary such functional groups include salt-forming groups. For example, basic salt forming groups can be introduced by reacting a suitable compound (e.g., a polyisocyanate) with a compound containing active hydrogen groups and active acidic groups neutralized with a base. Water-based anionically stabilized polyurethane polymers can be prepared by reacting polyols and dihydroxy carboxylic acid compounds with an excess of diisocyanate to provide a carboxylic acid functional prepolymer having NCO terminal groups. The acid groups can be neutralized with a base (e.g., a tertiary amine or metal salt) to provide salt groups and the neutralized prepolymer can be dispersed in water. An anionic stabilizing group in a water-dispersible polyurethane polymer may be replaced or used in conjunction with a nonionic stabilizing group, to facilitate water dispersibility. The water-dispersible polymer may optionally also be functionalized with olefinic groups or other crosslinkable groups where it is desired to enable the water-dispersible polymer to participate in radiation curing. Further details regarding such functionalized water-dispersible polymers are contained in applicants' above-mentioned copending PCT Application Serial No. PCT/U.S.2007/061326.

Oil-modified polymers may also be used as latex polymers or if appropriately stabilized as water-dispersible polymers. As used herein, oil-modified polymers include polymers that contain oils or oil based derivatives such as glyceride oils (monoglycerides, diglycerides, and the like), fatty acids, fatty amines, and mixtures thereof. Examples of such oil-modified polymers include alkyds, oil-modified polyurethanes, oil-modified polyamides, oil-modified acrylics, and mixtures or copolymers thereof. Preferably, the oil-modified polymer is an acid-functional alkali-soluble oil-modified polyurethane or alkyd. Oil-modified polymers are readily synthesized and can be made to be acid-functional and alkali-soluble using known techniques.

The disclosed coating systems or coating compositions preferably contain about 90 to about 10% by weight acid-functional alkali-soluble polymer based on the total weight of the non-volatile components in the coating system, more preferably about 80 to about 15% by weight and most preferably about 70 to about 20% by weight.

The disclosed coating systems may also contain latex polymers or water-dispersible polymers that are not themselves acid-functional alkali-soluble polymers. Exemplary commercially available latex polymers include AIRFLEX™ EF811 (available from Air Products), EPS 2505 (available from EPS/CCA) and NEOCAR 2300, NEOCAR 820 and NEOCAR 2535 (available from Dow Chemical Co.). Other exemplary latex polymers include the latex polymers described in co-pending U.S. patent application Ser. No. 11/560,329 filed Nov. 15, 2006. Exemplary functionalized latex polymers include ROSHIELD™ 3120 (available from Rohm & Haas) and the AAEM-functional latex polymers disclosed in U.S. patent application Ser. Nos. 11/300,070 filed Dec. 14, 2005 and 11/342,412 filed Jan. 30, 2006, and in the above-mentioned application Ser. No. 11/560,329.

In another embodiment, the coating system includes a functionalized latex polymer that incorporates acetoacetyl functionality. Acetoacetyl functionality may be incorporated into the polymer through the use of acetoacetoxyethyl acrylate, acetoacetoxypropyl methacrylate, allyl acetoacetate, acetoacetoxybutyl methacrylate, 2,3-di(acetoacetoxy)propyl methacrylate, 2-(acetoacetoxy)ethyl methacrylate, t-butyl acetoacetate, diketene and the like or combinations thereof. The acetoacetyl functional latex polymer can be prepared through chain-growth polymerization, using, for example, 2-(acetoacetoxy)ethyl methacrylate (AAEM). Preferred latex polymers include at least about 0.5 weight % acetoacetyl functionality based on the total weight of the latex polymer, more preferably about 0.5 to about 5 weight % acetoacetyl functionality based on the total weight of the latex polymer, and most preferably about 1 to about 4 weight % acetoacetyl functionality based on the total weight of the latex polymer. Such functionalized latex polymers are described in U.S. Patent Application Publication Nos. 2006/0135684 A1 and 2006/0135686 A1. In general, any polymerizable hydroxy functional or other active hydrogen containing monomer can be converted to the corresponding acetoacetyl functional monomer by reaction with diketene or other acetoacetylating agent (see, e.g., Comparison of Methods for the Preparation of Acetoacetylated Coating Resins, Witzeman, J. S.; Dell Nottingham, W.; Del Rector, F. J. Coatings Technology; Vol. 62, 1990, 101 (and references contained therein)). In preferred coating compositions, the acetoacetyl functional group is incorporated into the latex polymer via 2-(acetoacetoxy) ethyl methacrylate, t-butyl acetoacetate, diketene, or combinations thereof. The functionalized latex polymer is preferably prepared through chain-growth polymerization, using one or more ethylenically unsaturated monomers such as are described above.

If desired, the functionalized latex polymer may be a multistage latex polymer. Multistage latex polymer compositions contain at least two polymers of different glass transition temperatures (e.g., different Tg's) and may be prepared via emulsion polymerization using many of the aforementioned monomers. The latex may comprise a first polymer stage (the "soft stage") having a Tg between about −65 and 30° C., preferably between about −5 and 25° C., and a second polymer stage (the "hard stage") having a Tg between about 30 and 230° C., preferably between about 30 and 125° C. Multistage latexes are typically produced by sequential monomer feeding techniques. For example, a first monomer composition is fed during the early stages of the polymerization, and then a second different monomer composition is fed during the later stages of the polymerization. In certain embodiments it may be favorable to start the polymerization with a high Tg monomer composition and then switch to a low Tg monomer composition, while in other embodiments it may be favorable to start the polymerization with a low Tg monomer composition and then switch to a high Tg monomer composition.

Numerous hard and soft stages may also be utilized. For example, in certain compositions it may be beneficial to polymerize two different low Tg soft stage monomer compositions after the hard stage polymer is formed. The first soft stage may be a prepared with a monomer composition Tg close to room temperature (e.g., 20° C.) and the second soft stage may be prepared with monomer composition Tg well below room temperature (e.g., less than 5° C.). While not intending to be bound by theory, it is believed that this second soft stage polymer assists with improving coalescence of the latex polymer particles.

It may also be advantageous to use a gradient Tg latex polymer, which would contain an almost infinite number of Tg stages. For example, one may start with a high Tg monomer composition and then at a certain point in the polymerization start to feed the low Tg soft stage monomer composition into the high Tg hard stage monomer feed. The resulting multistage latex polymer will have a gradient Tg from high to low. A "power feed" process may be used to prepare such compositions. A gradient Tg polymer may also be used in conjunction with multiple multistage Tg polymers. As an example, one may prepare a high Tg monomer feed (F1) and a low Tg monomer feed (F2). One would begin to feed F1 into the latex reactor vessel and initiate polymerization. At a certain period during the F1 feed, one would then feed F2 into F1 wherein the F2 feed rate is faster than the overall feed rate of F1+F2 into the reactor vessel. Consequently, once the F2 feed into F1 is complete, the overall Tg of the F1+F2 monomer feed blend will be a lower Tg "soft stage" monomer composition.

Preferably, the multistage latex polymer is prepared with a high Tg alkali-soluble polymer hard stage made from an acid-functional alkali-soluble polymer having a backbone substantially free of linear or branched aliphatic alkyl repeating units having more than 3 backbone carbon carbons prepared as described above. A low Tg soft stage monomer composition could then be polymerized in the presence of the hard stage acid-functional alkali-soluble polymer to prepare a multistage latex polymer.

The disclosed multistage latex polymer preferably includes about 5 to about 95 weight percent soft stage polymer morphology based on total polymer weight, more preferably about 50 to about 90 weight percent soft stage polymer morphology based on total polymer weight, and most preferably about 55 to about 80 weight percent soft stage polymer morphology on total polymer weight. The disclosed multistage latex polymer preferably includes about 5 to 95 weight percent hard stage polymer morphology on total polymer weight, more preferably about 10 to about 50 weight percent hard stage polymer morphology on total polymer weight, and most preferably about 20 to about 45 weight percent hard stage polymer morphology on total polymer weight.

Compositions of this embodiment preferably include a multistage latex polymer in an amount of at least 10 weight %, more preferably at least 25 weight %, and even more preferably at least 35 weight %, based on total solids of the composition. Compositions of this embodiment preferably include a multistage polymer in an amount less than 95 weight %, more preferably less than 85 weight %, and even more preferably less than 80 weight %, based on the total solids in the composition.

The multistage latex polymer is preferably prepared through chain-growth polymerization, using one or more ethylenically unsaturated monomers as mentioned above. The ratios of the monomers may be adjusted to provide the desired level of "hard" or "soft" segments. In general, the Fox equation may be employed to calculate the theoretical Tg of the monomer composition being fed. For example, a soft segment may be introduced by providing a monomer composition comprising 5 to 65 parts butyl acrylate, 20 to 90 parts butyl methacrylate, 0 to 55 parts methyl methacrylate, 0 to 5 parts (meth)acrylic acid and 0 to 20 parts AAEM. In contrast, an acid-functional, alkali-soluble polymer hard segment may be introduced by providing a monomer composition comprising 0 to 20 parts butyl acrylate, 0 to 40 parts butyl methacrylate, 45 to 95 parts methyl methacrylate, 5 to 20 parts (meth) acrylic acid and 0 to 20 parts AAEM. The aforementioned compositions are illustrative of this concept and other compositions can be used in the practice of this invention. A preferred embodiment would contain at least 15 weight % butyl methacrylate based upon total functionalized multistage latex polymer solids. Preferably, the functionalized multistage latex polymer includes acetoacetyl functionality, which may be incorporated into the multistage polymer as described above. A water-soluble free radical initiator is typically used in the chain growth polymerization of the functionalized latex polymer as described above.

The functionalized latex polymers described above (whether single stage or multistage) may be stabilized by one or more nonionic or anionic emulsifiers (e.g., surfactants), used either alone or together as described above.

The disclosed coating systems include one or more water-soluble silicate salts. Visual observation of coating compositions containing such silicate salts indicated that inclusion of the silicate salt led to improved absorption of the coating composition into cement fiberboard substrates. The silicate salt may also serve as an alkaline base that helps to neutralize the acid-functional alkali-soluble polymer and render it soluble or dispersible in water. Examples of silicate salts include lithium silicate, potassium silicate, sodium silicate, ammonium silicate and the like. In preferred embodiments, the amount of silicate salt is from about 2 to about 50% by weight, more preferably from about 5 to about 40% by weight and most preferably from about 10 to about 35% by weight, based on the total weight of the non-volatile components. Silicate salts are available through a variety of chemical suppliers. For example, sodium silicate (sometimes referred to as waterglass) is available in a variety of forms including sodium orthosilicate ($Na_4SiO_4$), sodium metasilicate ($Na_2SiO_3$), sodium polysilicate (($Na_2SiO_3$)n) and sodium pyrosilicate ($Na_6Si_2O_7$). Sodium silicate and potassium silicate (sometimes referred to as potassium waterglass) are available from PQ Corporation, Valley Forge, Pa.

The disclosed coating systems contain water. The water may for example be distilled, deionized or tap water. The amount of water preferably is about 95 to about 40 wt. %, more preferably about 90 to about 60 wt. % and most preferably about 85 to about 50 wt. % of the total coating system weight.

The disclosed coating systems may contain one or more optional olefinic compounds. An olefinic compound appears to function as a reactive penetrant. This may be better appreciated by observing a coating system containing an olefinic compound after the system is applied to the substrate but before radiation curing is performed. An olefinic compound appears to improve wetting or penetration, and may help draw at least a portion of the other coating system components into pores in the substrate. An olefinic compound also appears to help the coating adhere to the substrate following cure or other hardening. Further details regarding such olefinic compounds are contained in applicants' above-mentioned copending PCT Application Serial No. PCT/U.S.2007/061326.

If desired, the disclosed coating system may optionally include an epoxy resin system. The epoxy resin system is typically a multi-component coating system. Epoxy resin systems include multi-functional epoxy resins (e.g., di-, tri-, tetra-, and other multi-functional epoxy resins) that are prepared from aliphatic or aromatic starting materials. Examples of such multi-functional epoxy resins include the reaction products of epoxy containing compounds (e.g., epichlorohydrin) with multi-functional aliphatic or aromatic alcohols or acids. Further details regarding such epoxy resins are contained in applicants' copending PCT Applications Serial No. PCT/U.S.2007/069387, filed May 21, 2007 and entitled COATING SYSTEM FOR CEMENT COMPOSITE ARTICLES and PCT/U.S.2007/073070, filed Jul. 9, 2008 and entitled COATING SYSTEMS FOR CEMENT COMPOSITE ARTICLES.

Other optional components for use in the coating systems herein are described in Koleske et al., Paint and Coatings Industry, April, 2003, pages 12-86. Typical performance enhancing additives that may be employed include surface active agents, pigments, colorants, dyes, surfactants, dispersants, defoamers, thickeners, heat stabilizers, leveling agents, coalescents, biocides, mildewcides, anti-cratering agents, curing indicators, plasticizers, fillers, sedimentation inhibitors, ultraviolet light absorbers, optical brighteners, and the like to modify properties.

The coating systems may also contain an optional coalescent and many coalescents are known in the art. The optional coalescent is preferably a low VOC coalescent such as is described in U.S. Pat. No. 6,762,230.

Other optional components for use in the coating systems herein are described in Koleske et al., Paint and Coatings Industry, April, 2003, pages 12-86. Typical performance enhancing additives that may be employed include surface active agents, pigments, colorants, dyes, surfactants, dispersants, defoamers, thickeners, heat stabilizers, leveling agents, coalescents, biocides, mildewcides, anti-cratering agents, curing indicators, plasticizers, fillers, sedimentation inhibitors, ultraviolet light absorbers, optical brighteners, and the like to modify properties.

Optional pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, and/or organic yellows (such as Hansa yellow). The composition can also include a gloss control additive or an optical brightener, such as that commercially available under the trade designation UVITEX OB from Ciba-Geigy.

Optional fillers and inert ingredients include, for example, clay, glass beads, calcium carbonate, talc, silicas, organic fillers, and the like. Fillers extend, lower the cost of, alter the appearance of, or provide desirable characteristics to the composition before and after curing.

The disclosed coating systems and coating compositions may include other ingredients that modify properties of the coating system or coating composition as it is stored, handled, or applied, and at other or subsequent stages. Optional waxes, flatting agents, mar and abrasion additives, and other similar performance enhancing additives may be employed as required in amounts effective to upgrade the performance of the coating system, coating composition or hardened coating. Desirable performance characteristics for the hardened coating include chemical resistance, abrasion resistance, hardness, gloss, reflectivity, appearance, or combinations of these characteristics, and other similar characteristics.

Wet adhesion testing and "freeze-thaw" cycles have been shown, under laboratory conditions, to simulate long-term outdoor exposure encountered in northern climates. A Wet Adhesion Test may be carried out as follows to evaluate adhesion of the coating system after a coated cement fiberboard substrate has been saturated with water. According to this test procedure, coated substrates (e.g., fiber cement boards) are soaked in room temperature water for 24 hours. After soaking, the boards are removed from the water and kept at room temperature for 24 hours. A six-inch (15.24 cm) length of 3M HD 250 tape is applied to the surface of the board with the long axis of the tape in the direction of any embossing patterns that may be present. The tape is firmly pressed onto the board ensuring full contact. The tape is then removed by quickly pulling it off at a 90-degree angle to the board. "Wet Adhesion" performance is rated based on the percent of coating removed from the cement board. Performance is further assessed by noting where any failure occurs. For example, failure may occur between interfacial coating layers, between the coating and the surface of the board, or within the board itself. Preferred coating systems or coating compositions typically have less than 25% coating removal, more preferably less than 15% coating removal. In addition, the failure preferably is within the board as indicated by a significant amount of fiber from the board adhering to the removed coating.

Preferred coated articles can withstand at least 30 freeze-thaw cycles, when tested according to ASTM D6944-03, Test Method A. As written, this ASTM test method recites a 30-cycle sequence. However, rather than simply grade a specimen as a "pass" at the end of 30 cycles, the test desirably is lengthened to include additional cycles. More preferably, the coated articles can withstand at least 75 freeze-thaw cycles, most preferably at least 125 freeze-thaw cycles and optimally at least 175 freeze-thaw cycles.

The disclosed coating systems or coating compositions preferably have improved, viz., lower, volatile organic content (VOC). The coating systems or coating compositions desirably have a VOC of less than about 5%, based on the total weight of the coating system, preferably a VOC of less than about 2%, more preferably a VOC of less than about 0.5%.

Exemplary coating compositions that can be used in the disclosed coating systems are listed below. This is not intended to be an exhaustive list of coating compositions.

| | |
|---|---|
| A | acid-functional alkali-soluble polymer; |
| B | acid-functional alkali-soluble polymer and silicate salt (e.g., potassium silicate); |
| C | acid-functional alkali-soluble polymer, polyurethane dispersion (e.g., EPS 4208 or LUX 399 (available from Alberdink Boley)), and silicate salt; |
| D | Multistage latex polymer comprising an acid-functional alkali-soluble polymer, and silicate salt; |
| E | acid-functional alkali-soluble polymer, silicate salt and epoxy resin system; and |
| A2-E2 | The above compositions A-E further comprising one or more olefinic compounds and an optional initiator (e.g., a UV photoinitiator, such as DAROCUR ™ 1173 or DAROCUR 4265 from Ciba). |

A variety of application routes may be employed for preparing the coated articles. Specific application routes include:
  Apply a coating composition, dry to remove at least a portion of the water and cure or otherwise harden the coating system;
  Apply a coating composition, apply one or more additional coating composition(s), dry to remove at least a portion of the water and cure or otherwise harden the coating system; and
  Apply a coating composition and dry to remove at least a portion of the water, apply one or more additional coating composition(s), dry to remove at least a portion of the water and cure or otherwise harden the coating system.

Accordingly, the articles can be prepared by applying the coating system as a single coating composition or the coating system can be applied as multiple compositions. In coating systems using multiple coating compositions, (i) the applied coating composition(s) can be dried (to remove at least a portion of the water) prior to curing or addition of one or more additional coating compositions, or (ii) the coating composition(s) can be applied prior to drying the previously applied coating composition(s), thus allowing the coating compositions to mix at an interface.

The disclosed coating composition(s) are preferably applied at about 5 to 50% solids by weight and more preferably at about 10 to 40% solids. The coating systems may be applied by any number of application techniques including but not limited to brushing (e.g., using a brush coater), direct roll coating, reverse roll coating, flood coating, vacuum coating, curtain coating and spraying. The various techniques each offer a unique set of advantages and disadvantages depending upon the substrate profile, morphology and tolerable application efficiencies. Lower viscosities facilitate uniform film control. The applied film thickness may be controlled for example by varying the application rate.

The disclosed coating systems may for example be applied to a cement fiberboard substrate by roll coating. A dry film thickness (DFT) of the coating system on the cement fiberboard substrate may for example be in the range of, but not limited to, about 0.2 to about 4 mil (about 0.005 to about 0.1 mm), more preferably about 0.3 to about 3 mil (about 0.008 to about 0.08 mm).

It is preferred that the coated articles are coated on at least one major surface with the coating system. More preferably, the coated articles are coated on a major surface and up to four minor surfaces including any edges. Most preferably, the coated articles are coated on all (e.g., both) major surfaces, and up to four minor surfaces including any edges.

A topcoat may be applied directly to the coating system. The coating systems and coating compositions described herein may be used in place of or in addition to coatings that the prior art has categorized as "sealers," "primers" and "topcoats." However, the systems and compositions may not fit neatly into any category per se and such terms should not be limiting.

It is also noted that the disclosed coating systems and coating compositions can be used with other coating compositions such as those disclosed in the following applications: U.S. Provisional Application Ser. Nos. 60/764,103, 60/764,131 and 60/764,242 (each filed Jan. 31, 2006) and 60/802,185 filed May 19, 2006.

The invention will be described by the following non-limiting examples. Unless otherwise indicated, all parts and percentages are by weight.

EXAMPLE 1a

Alkali Soluble Polymer A

An alkali soluble polymer was prepared from a monomer mixture of methyl methacrylate (MMA), methacrylic acid (MAA), dodecylmercaptan and 3-mercaptopropionic acid. The ratio of MMA to MAA was 91:9. The polymer was prepared at 21% solids in deionized water and was rendered water soluble via the addition of a 1:1 mix of potassium hydroxide and sodium hydroxide until a pH of greater than 7 resulted.

EXAMPLE 1b

Alkali Soluble Polymer B

An alkali soluble polymer was prepared from a monomer mixture of methyl methacrylate (MMA), methacrylic acid (MAA), dodecylmercaptan and 3-mercaptopropionic acid. The ratio of MMA to MAA was 90:10. The polymer was prepared at 21% solids in deionized water and was rendered water soluble via the addition of ammonium hydroxide until a pH of greater than 7 resulted.

EXAMPLE 2a

Multistage Latex Polymer A

An acetoacetyl functional multistage latex polymer is prepared by adding a monomer mixture containing butyl acrylate (BA), methyl methacrylate (MMA), and 2-(acetoacetoxy) ethyl methacrylate (AAEM) to alkali soluble polymer A. The ratio of BA/MMA/AAEM is 52/43/5. 65 parts of the monomer mixture is added to 35 parts of the alkali soluble polymer. The monomer mixture is polymerized with a redox initiation system of t-butyl hydroperoxide and isoascorbic acid. The final solids level for the combined polymer mixture would be about 35% in water.

EXAMPLE 2b

Multistage Latex Polymer B

An acetoacetyl functional multistage latex polymer is prepared by adding a monomer mixture containing butyl acrylate (BA), methyl methacrylate (MMA), styrene (S), and 2-(acetoacetoxy)ethyl methacrylate (AAEM) to alkali soluble polymer A. The ratio of BA/MMA/S/AAEM is 55.5/24.5/15/5. 60 parts of the monomer mixture is added to 40 parts of the alkali soluble polymer. The monomer mixture is polymerized with a redox initiation system of t-butyl hydroperoxide and isoascorbic acid The final solids level for the combined polymer mixture would be about 35% in water.

EXAMPLE 2c

Multistage Latex Polymer C

An acetoacetyl functional multistage latex polymer is prepared by adding a monomer mixture containing butyl acrylate (BA), methyl methacrylate (MMA), styrene (S), and 2-(acetoacetoxy)ethyl methacrylate (AAEM) to alkali soluble polymer B. The ratio of BA/MMA/S/AAEM is 49/26/15/10. 65 parts of the monomer mixture is added to 35 parts of the alkali soluble polymer. The monomer mixture is polymerized with a redox initiation system of t-butyl hydroperoxide and isoascorbic acid. The final solids level for the combined polymer mixture would be about 35% in water.

EXAMPLE 2d

Multistage Latex Polymer D

An multistage latex polymer is prepared by adding a monomer mixture containing butyl acrylate (BA), methyl methacrylate (MMA), styrene (S), and 2-(aceto-acetoxy)ethyl methacrylate (AAEM) to the alkali soluble polymer B. The ratio of BA/MMA/S is 58/27/15. 60 parts of the monomer mixture is added to 40 parts of the alkali soluble polymer. The monomer mixture is polymerized with a redox initiation system of t-butyl hydroperoxide and isoascorbic acid. The final solids level for the combined polymer mixture would be about 35% in water.

EXAMPLES 3a-d

Coating Compositions with Potassium Silicate

In a mixing vessel the following components are added under agitation:

| Ingredient | Example 3a | Example 3b | Example 3c | Example 3d |
| --- | --- | --- | --- | --- |
| Example 2a | 142 grams | — | — | — |
| Example 2b | — | 142 grams | — | — |
| Example 2c | — | — | 142 grams | — |
| Example 2d | — | — | — | 142 grams |
| Deionized water | 245 grams | 245 grams | 245 grams | 245 grams |
| FOAMMASTER 111 | 0.25 grams | 0.25 grams | 0.25 grams | 0.25 grams |
| Potassium Silicate | 57 grams | 57 grams | 57 grams | 57 grams |

Samples mix for 30 minutes, and the coating system is allowed to de-air. The coating is then applied to a fiber cement article at a dry film thickness of 0.5 to 0.7 mils (0.00127 to 0.001778 cm) by either a single coating application or by two or more coating applications, and a portion of the water is removed, either by air drying, a heated drying stage or by application to a warm substrate (e.g., about 38° C.). The coated substrate may then be coated with a second coating system, e.g., using a topcoat as disclosed in co-pending U.S. patent application Ser. No. 11/560,329.

EXAMPLE 4

Acetoacetyl Functional Latex Polymer

A reactor was charged with 567 parts of deionized water and 1.5 parts RHODAPON UB sodium lauryl sulfate (Rhodia). The reaction mixture was heated to 75° C. under a nitrogen blanket. During heating, a pre-emulsion was formed containing 331 parts of deionized water, 56.8 parts of RHODAPON UB, 0.9 parts ammonium persulfate, 149 parts of 2-ethyl hexyl acrylate, 732 parts of butyl methacrylate, 28.1 parts of AAEM, and 28.1 parts of methacrylic acid. Once the reaction mixture reached 75° C., 2.8 parts of ammonium persulfate was added to the reactor and the monomer feed started for a 3 hour feed rate. The reaction temperature was held between 80° C. to 85° C. during polymerization. Once the pre-emulsion feed was complete, the container was rinsed with 20 parts of deionized water and the reaction was held 30 minutes. A post reaction consisting of 0.9 parts t-butyl hydroperoxide mixed with 20 parts of deionized water and 0.7 parts of isoascorbic acid mixed with 20 parts of deionized water was then added over 30 minutes. The resulting latex polymer was then cooled to 40° C., 28% concentrated ammonia was added to adjust the pH to 7.5-8.5 and deionized water was added to adjust the weight solids to 48%.

EXAMPLE 5

Multistage Acetoacetyl Functional Latex Polymer

A reactor was charged with 547 parts of deionized water and 1.5 parts RHODAPON UB. The reaction mixture was heated to 75° C. under a nitrogen blanket. During heating, pre-emulsion 1 was formed containing 215 parts of deionized water, 37 parts of RHODAPON UB, 0.6 parts ammonium persulfate, 103 parts of 2-ethyl hexyl acrylate, 470 parts of butyl methacrylate, 18 parts of AAEM, and 18 parts of methacrylic acid. Pre-emulsion 2 was formed containing 116 parts of deionized water, 20 parts of RHODAPON UB, 0.3 parts ammonium persulfate, 223 parts of methylmethacrylate, 85 parts of butyl methacrylate, 10 parts of AAEM, and 10 parts of methacrylic acid. Once the reaction mixture reached 75° C., 2.8 parts of ammonium persulfate was added to the reactor and the pre-emulsion 1 started for a 2 hour feed rate. Once pre-emulsion 1 was added, the container was rinsed with 20 parts deionized water and pre-emulsion 2 started for a 1 hour feed rate. The reaction temperature was held between 80° C. to 85° C. during polymerization. Once the pre-emulsion 2 feeds was complete, the container was rinsed with 20 parts of deionized water and the reaction was held 30 minutes. A post reaction consisting of 0.9 parts t-butyl hydroperoxide mixed with 20 parts of deionized water and 0.7 parts of isoascorbic acid mixed with 20 parts of deionized water was then added over 30 minutes. The resulting latex polymer was then cooled to 40° C., a 28% concentrate ammonia was added to adjust the pH to 7.5-8.5 and deionized water was added to adjust the weight solids to 48%.

EXAMPLES 6a-c

Paint Compositions

In a mixing vessel equipped with a high-speed mixer and dispersion blade the following ingredients were added in order (parts by weight):

| Ingredient | | Example 6a | Example 6b | Example 6c |
|---|---|---|---|---|
| Water | | 100.96 | 100.96 | 100.96 |
| CELLOSIZE QP 09-L | Thickener | 0.75 | 0.75 | 0.75 |

The above ingredients were mixed for 5 minutes or until homogenous, and then the following ingredients were added (parts by weight):

| Ingredient | | Example 6a | Example 6b | Example 6c |
|---|---|---|---|---|
| DEHYDRAN 1620 | Defoamer | 1.5 | 1.5 | 1.5 |
| TEXANOL | Co-solvent | 15 | 15 | 15 |
| DISPERBYK 190 | Dispersant | 7 | 7 | 7 |
| Ammonia 26 BE | Neutralizer | 1 | 1 | 1 |
| TI PURE R902-28 | Pigment | 220 | 220 | 220 |
| ASP 170 Alum. Silicate | Extender | 85 | 85 | 85 |

The above ingredients were mixed at high speed for 15 minutes, and then the following ingredients were added (parts by weight):

| Ingredient | | Example 6a | Example 6b | Example 6c |
|---|---|---|---|---|
| Ammonia 26 BE | Neutralizer | 1 | 1 | 1 |

To the above mixture was added the following in order (parts by weight):

| Ingredient | | Example 6a | Example 6b | Example 6c |
|---|---|---|---|---|
| Water | | 46.6 | 46.6 | 46.6 |
| Example 4 latex | | 596.24 | — | — |
| Example 5 latex | | — | 596.24 | — |
| NEOCRYL XK 90 latex | | — | — | 636 |
| Water | | 16.68 | 16.68 | 16.68 |
| BYK 024 | Defoamer | 1 | 1 | 1 |
| ACRYSOL RM-2020NPR | Thickener | 1.52 | 1.52 | 1.52 |

The above ingredients were mixed for 15 minutes using moderate agitation.

EXAMPLE 7

Tape Adhesion Test Results

A 15.24×21 cm board sample may be prepared as described in Example 3 and then a second coating system applied using the following technique.

Preheat board sample to 43° C. (~110° F.) using a convection oven set at 149° C. (300° F.). Apply approximately 5.2 grams of the coating system by spreading evenly over the surface of the board using either a bristle or foam brush. Immediately after coating the board, place it in a 149° C. (300° F.) oven until the board surface temperature reaches 60° C. (140° F.). Remove sample and allow it to cool to room temperature.

Adhesion test procedure: A board sample that is sealed, top-coated and dried can be tested for coating adhesion using 3™ 250 masking tape. The adhesion of a coating system to the surface of a board may be tested after the coating system is applied and cured or otherwise hardened. To the surface of the board apply at least a 3 inch strip of masking tape. Firmly press the tape to the board surface using either a rubber roller or a thumb applying a minimum of 5 psi to the full length of the tape for 10 seconds. Allow 2 minutes for the adhesive to equilibrate on the board surface. After equilibrating, remove the tape by rapidly (equal to or less than 1 second) pulling it up at a 90 degree angle. Failure is reported as a combination of coating adhesion failure and also board surface failure. When one tests adhesion, the systems coated with the disclosed coating system containing an acid-functional, alkali-soluble polymer and silicate salt will exhibit less than 10% adhesion loss. In contrast, the boards that are not coated with this coating system will exhibit approximately 50% adhesion loss.

All patents, patent applications and literature cited in the specification are hereby incorporated by reference in their entirety. In the case of any inconsistencies, the present disclosure, including any definitions therein will prevail. The invention has been described with reference to various specific and preferred embodiments and techniques. However, it should be understood that many variations and modifications may be made while remaining within invention.

What is claimed is:

1. A coated article including a cement fiberboard substrate and a coating system applied to the substrate, wherein the coating system comprises:
   (i) at least one acid-functional alkali-soluble polymer having a backbone substantially free of linear or branched aliphatic alkyl repeating units having more than 3 backbone carbon carbons,
   (ii) at least one water-soluble silicate salt, and
   (iii) water,
wherein the silicate salt is potassium silicate, sodium silicate, lithium silicate, ammonium silicate or mixtures thereof and is present in an amount of from about 2 to about 50% by weight, based on the total weight of the non-volatile components.

2. The coated article of claim 1, wherein the acid-functional alkali-soluble polymer is derived from a reaction mixture containing at least one acid-functional monomer in an amount sufficient to provide at least 5 wt. % acidic monomers in the reaction mixture.

3. The coated article of claim 1, wherein the acid-functional alkali-soluble polymer is derived from a reaction mixture containing at least one acid-functional monomer in an amount sufficient to provide at least 8 wt. % acidic monomers in the reaction mixture.

4. The coated article of claim 1, wherein the acid-functional alkali-soluble polymer contains less than 8 wt. % linear or branched aliphatic alkyl repeating units having more than 3 backbone carbon carbons.

5. The coated article of claim 1, wherein the acid-functional alkali-soluble polymer has a number average molecular weight of no more than 25,000 daltons.

6. The coated article of claim 1, wherein the acid-functional alkali-soluble polymer is present in an amount of from about 15 to about 80% by weight, based on the total weight of the non-volatile components.

7. The coated article of claim 1, wherein the silicate salt is present in an amount of from about 10 to about 35% by weight, based on the total weight of the non-volatile components.

8. The coated article of claim 1, wherein acid-functional alkali-soluble polymer comprises a multistage latex polymer.

9. The coated article of claim 8, wherein the multistage latex polymer is derived from acetoacetyl ethyl methacrylate.

10. The coated article of claim 1, wherein the coating system further comprises an epoxy resin system.

11. The coated article of claim 1, wherein the coating system further comprises one or more olefinic compounds and is radiation curable.

12. The coated article of claim 1, wherein the coating system further comprises a coalescent.

13. The coated article of claim 1, wherein the coated article has a first and a second major surface and four edges, and wherein the article has been coated on both major surfaces and on the four edges with the coating system.

14. The coated article of claim 1, wherein the coating system is applied to a dry film thickness of about 0.005 to about 0.1 mm.

15. The coated article of claim 1, wherein the article has further been coated with a second coating system comprising a latex-containing primer, latex-containing topcoat, or both a latex-containing primer and latex-containing topcoat.

16. The coated article of claim 15, wherein the second coating system comprises a functionalized latex polymer or a multistage latex polymer or a functionalized, multistage latex polymer.

17. The coated article of claim 1, wherein the article has further been coated with a second coating system comprising an acetoacetoxy-functional latex-containing primer, acetoacetoxy-functional latex-containing topcoat, or (iii) both an acetoacetoxy-functional latex-containing primer and acetoacetoxy-functional latex-containing topcoat.

18. The coated article of claim 1, wherein the article after cure or hardening can withstand at least 75 freeze-thaw cycles.

19. A method for making a coated article, which method comprises:
   providing a cement fiberboard substrate;
   coating at least a portion of the substrate with a coating system of claim 1; and
   curing or otherwise hardening the coating.

20. The coated article of claim 1, wherein the coating system contains less than 2 weight % volatile organic content based on the total coating system weight.

21. The coated article of claim 1, wherein the coating system contains less than 0.5 weight % volatile organic content based on the total coating system weight.

* * * * *